235-379
10/27/87 OR 4,703,162

United States Patent [19]
Holland-Letz et al.

[11] Patent Number: 4,703,162
[45] Date of Patent: Oct. 27, 1987

[54] DEVICE FOR RECEIVING, INSPECTING AND STORING INSTRUMENTS OF VALUE

[75] Inventors: Guenter Holland-Letz; Waldemar Jaeger, both of Paderborn; Udo Tewes, Paderborn-Elsen; Peter Weigel, Borchen-Doerenhagen, all of Fed. Rep. of Germany

[73] Assignee: Nixdorf Computer AG, Paderborn, Fed. Rep. of Germany

[21] Appl. No.: 852,676

[22] Filed: Apr. 16, 1986

[30] Foreign Application Priority Data

Apr. 16, 1985 [DE] Fed. Rep. of Germany ....... 3513635

[51] Int. Cl.[4] .............................................. G06F 15/30
[52] U.S. Cl. .................................................... 235/379
[58] Field of Search ......................................... 235/379

[56] References Cited

U.S. PATENT DOCUMENTS 4,602,323 7/1986 Hiroje ................................ 235/379

*Primary Examiner*—Harold I. Pitts
*Attorney, Agent, or Firm*—Cullen, Sloman, Cantor, Grauer, Scott & Rutherford

[57] ABSTRACT

A device for receiving, inspecting and storing instruments of value, comprising a lockable housing having at least one instrument receptacle (36), an inspection means for inspecting and identifying the instruments, a deposit unit (14) having a deposit pocket (18) and a return pocket (20) arranged on a wall (16) of the housing. Conveyors (28, 38) are provided for conveying instruments between the deposit unit (14) and the inspection unit and between the inspection unit and the instrument receptacle (36). The instrument receptacle (36) and a first part of the inspection unit (34) for verifying the genuineness of and identifying the instruments are arranged inside a closed vault (12). Instruments are moved between the closed vault and the deposit unit (14) by way of a two-way conveyor (28) passing through an opening (30) in the wall of the vault (12).

22 Claims, 11 Drawing Figures

DEVICE FOR RECEIVING, INSPECTING AND STORING INSTRUMENTS OF VALUE

TECHNICAL FIELD

The invention relates to a device for receiving, inspecting and keeping instruments of value, in particular bank notes, comprising a lockable housing containing at least one instrument receptacle, an inspection means for inspecting and identifying the instruments, a deposit/-return unit having a deposit pocket and a return pocket arranged in the wall of a housing, and conveyors for conveying instruments between the deposit/return unit and the inspection means on the one hand and between the inspection means and the instrument receptacle on the other hand.

BACKGROUND ART

Prior devices for receiving, inspecting and storing instruments such as bank notes have comparatively low security standard. Such devices have a housing which consists essentially of ordinary steel sheet and is closed with ordinary security locks. It is not especially difficult to procure suitable duplicate keys for opening the housing. The housing cannot withstand serious efforts to reach the instrument receptacle and/or the inspection means by force. Such a unit is therefore unfit for use at customer-operated facilities in banks, let alone outside of a bank building, at least according to the security standards deemed acceptable in the Federal Republic of Germany.

Of course, it has long been possible for bank customers to deposit money at the bank outside of office hours by dropping the money off in a locked container, generally through an opening in the outside wall of the bank building. The container can be opened the next day and the cash can be verified, sorted, counted and credited from a slip enclosed in the container. One difficulty with existing devices for receiving, inspecting and storing instruments is that once the bank notes have been stored in the instrument receptacles, they can no longer be traced to a particular person. The bank notes must be reliably checked before they are deposited in the receptacles, and immediately returned to the customer if there are any doubts as to their genuineness or other defects. Hence, it is not sufficient simply to provide a deposit slot in the housing, which might in particular consist of a thick-walled vault; a suitable conveyor mechanism must also be provided, and a sufficiently large dispensing opening so that rejected bills can be returned to the customer. The wall openings required for a deposit pocket in which a bundle of bank notes may be deposited and a return pocket from which a bundle of bank notes may be returned, however, are too large for a vault, and hence unacceptable. Hence, the security arrangements required for keeping bank notes could not be met by simply reinforcing the housing in the known devices.

SUMMARY OF THE INVENTION

The object of the invention is to enchance security of instrument receptacles or other security-related parts of an apparatus for receiving, inspecting and storing bank notes and the like against access by unauthorized persons.

This object is accomplished, according to the invention, in that the instrument receptacle and at least one inspection unit serving to examine the instrument for genuineness and identify them are arranged inside a closed vault, communicating with the deposit/return unit via a two-way conveyor belt passing through an opening in the wall of the vault.

Those parts of the installation which must be protected from access by unauthorized persons are arranged, according to the invention, in a vault, communicating with the outside only through a small aperture such as is required for the two-way conveyor. The deposit/return unit, on the other hand, which establishes the connection between the facility and the customer, and requires comparatively large openings in the housing for the deposit and dispensing pockets, may be accommodated as heretofore in an ordinary lockable housing. This simplifies the construction of the deposit pocket and return pocket as well as the entire instrument handling system inside the deposit/return unit.

The deposit/return unit may expediently comprise a deposit track leading from a peeling and separating means at the deposit pocket to the two-way conveyor and a return track leading from the two-way conveyor to the return pocket, a pre-inspection unit being arranged in the path of the deposit track for screening the instruments, and the deposit and return tracks being capable of being placed in direct communication with each other by means of a switch controllable by the preliminary inspection unit.

The advantage of this arrangement is that physical defects in the bank notes deposited, as for example paper clips, adhesive tape, torn and creased portions, which might cause trouble in the actual sophisticated inspection units for verification of genuineness and identification of the bank notes, are detected at pre-inspection, so that the bank notes can be sorted before they enter the vault and can be returned to the customer.

In case of a breakdown, ordinarily the vault can be opened only by two persons holding two different keys. The housing containing the pre-inspection unit, however, may be opened with a key that the bank employee tending the machine may carry with him. In this way, disruption of operations inside the bank because of trifling mechanical defects in the bank notes tendered may be avoided.

According to an especially compact embodiment, the two-way conveyor comprises three rows of feed rollers arranged side-by-side, the feed rollers of pairs of rows immediately adjacent to each other being driven in opposed directions of rotation. Handling bank notes is still further improved if endless belts are passed over the feed rollers in each row.

According to an especially convenient embodiment, it is possible for the customer to interrupt the depositing operation at any moment until all bank notes have been inspected and recover all of the money deposited. For this reason, an instrument holding buffer capable of being connected to the two-way conveyor is arranged between the outlet of the verifying unit and a collection conveyor connecting it to the instrument receptacle. The instrument holding buffer holds the ready-verified bank notes until the entire inspection operation has been completed. If the customer interrupts the operation prior to the completion of the inspection operation, the items in the bundle of bank notes collected in the holding buffer are successively carried back to the return pocket by the two-way conveyor. But if the deposit operation is not interrupted, on completion of inspection the instruments in the holding buffer are conveyed to the several instruments receptacles by the collection conveyor.

Mechanical defects such as were described above in the bank notes deposited may be detected simply by thickness scanning, the pre-inspection unit having two sensor cylinders with variable distance between center-lines, forming a gap between them to scan the thickness of the instruments passing through.

The aligning zone may expediently be arranged for the instruments, in which the instruments are run against a contact edge so that they may be supplied to the inspection unit by the two-way conveyor in a well-defined position, and not get caught either at the opening in the wall of the vault or at the entrance slot of the inspection unit because the customer cannot be expected to deposit instruments in the deposit pocket accurately stacked and aligned. An aligning zone may be arranged between the inspection unit and the two-way conveyor.

In conventional equipment, the instruments are as a rule conveyed in transverse direction. In the device according to the invention, the opening in the wall of the vault may be further reduced in size if the instruments are conveyed lengthwise. For this purpose, according to the invention, the peeling and individuating means is so arranged at one lengthwise end of the deposit pocket that the instruments are peeled off and introduced into the conveyor track lengthwise.

According to another feature of the invention, the deposit pocket and the return pocket are each bounded by a support plate and a contact pressure plate which extends substantially parallel thereto. The pressure plate is displaceable substantially perpendicular to the support plate and parallel to itself, and urged towards the support plate.

The support plate and the pressure plate are preferably curved about an axis of curvature parallel to the direction of peeling, in the direction of entry of the instruments. The curvature of the support and pressure plates has the advantage that the instruments being conveyed lengthwise are stiffened somewhat by the curvature, and so may be pushed to some extent. This is a factor especially in the case of bank notes, which in use are often folded or rolled transverse to the lengthwise direction and hence tend to collapse under a pushing action. Considerable difficulties are involved in pushing such bank notes for example into a holding pocket. To make this possible in the case of the return pocket, the device according to the invention is provided with a first feed roller having a concave periphery and second feed roller cooperating therewith and having a convex periphery at the end of the return pocket near the return track. The two cooperating feed rollers arch the entering instruments to match the curvature of the pressure plate and support plate, lending it the necessary stiffness to be pushed into the return pocket.

Instead of the feed rollers with respectively concave and convex periphery, a plurality of coaxial first feed rollers may be arranged at the end of the return track near the return pocket at an axial distance from each other, each cooperating with associated second feed rollers. The diameters of the first and second feed rollers are such that the gap formed between the feed rollers is curved about an axis parallel to the direction of transport. In this way, a curvature of the instrument being supplied to the return pocket is likewise achieved, enhancing its rigidity in the direction of transport. This modification is especially suitable for instruments being transported in crosswise direction.

The support plate and the contact pressure plate of both pockets may be arranged on a flap hinged to a housing wall to swing about an axis parallel to the housing wall between a closed position and an open position. The arrangement is intended to prevent the mechanism from beginning to function until the deposit of the bank notes and the deposit pocket has been closed. This eliminates the possibility that a customer may inadvertently or deliberately interfere with the operation of the sensitive transport mechanism of the deposit/return unit. The return pocket is also prevented from opening until the rejected bank notes are in the return pocket.

The contact plate is made to track straight on the flap of the deposit pocket in a simple manner by means of two levers mounted at one end in a spaced axial relationship to each other on the flap shaft, and at the other end the contact plate is linked to the pressure plate by means of a pin-and-slot link with a pivoting axis parallel to the flap shaft. The pressure plate is connected to the flap by a joint comprising a double latch with axes directed parallel to the plane of the flap and perpendicular to its axis. In combination with the double latches, the levers ensure a wobble-free parallel guidance of the pressure plate with a minimum of linkage.

When bank notes are deposited in the deposit pocket, the pressure plate, ordinarily pressed against the support plate, is lifted off the support plate to provide enough clearance for insertion of the bank notes. This is simply accomplished since the double latch is connected fixed with respect to rotation about the latch axis near the flap to a cam slide. Also, the cam slide can be swung in the direction of approach of the latch to the flap by means of a cam track upon passage of the flap into its open position. The pressure plate is thus drawn against the flap by the deflection of the cam slide and so withdraws from the support plate, which is rigidly attached to the flap.

In the case of the return pocket, it is not necessary to lift the pressure plate off of the support plate upon opening of the return pocket. For the return pocket, therefore, a sufficient arrangement is one in which the the pressure plate is connected to the flap by a join comprising a double latch with axes directed parallel to the plane of the flap and perpendicular to this axis, and urged towards the support plate by springs.

In the device according to the invention, instruments of different dimensions, and in particular of different lengths, are to be handled. The difficulty in handling different length notes is preventing an instrument, when thrust into the return pocket, from striking the posterior edge of an instrument already in place in the return pocket, and collapsing. This difficulty is overcome according to the invention, by arranging a positioning mechanism in the return pocket to position an instrument with its posterior edge at a preassigned location in the return pocket. Also, the direction of transport at the end of the return track near the return pocket forms an obtuse angle with the direction of advance inside the return pocket. When viewed in the direction of transport, the point where an arriving instrument lands in each instance is located behind the preassigned position for the posterior edge of the preceding instrument. The positioning mechanism ensures that the posterior edge of an instrument being thrust into the return pocket is always in the same place, independent of the length of the instrument. Thus, the point of landing for the folowing instrument can be fixed as well. Since the point of landing lies behind the posterior edge of the instrument when viewed in the direction of transport, the next instrument will slide in over the instrument already in the return pocket.

According to a preferred embodiment of the invention the positioning mechanism comprises a drive element driven by a drive motor and adapted to rest against an instrument. A sensor means is arranged in the path of the arriving instrument at a distance ahead of the drive element which starts the drive motor with a delay after passage of the anterior edge of an instrument and stops it upon passage of the posterior edge. Switching on the drive motor with some delay ensures that the next instrument will slip over the instrument already inside the return pocket before the instrument already in the return pocket is thrust farther into it. The return pocket must then be long enough overall so that when the instruments are pushed into the pocket, they do not collapse. Other features and advantages of the invention will become apparent from the following description, in view of the attached drawings, illustrating embodiments of the invention by way of example and in view of the appended claims.

DETAILED DESCRIPTION OF THE PREFERRED EMBODIMENTS

Figure 1:
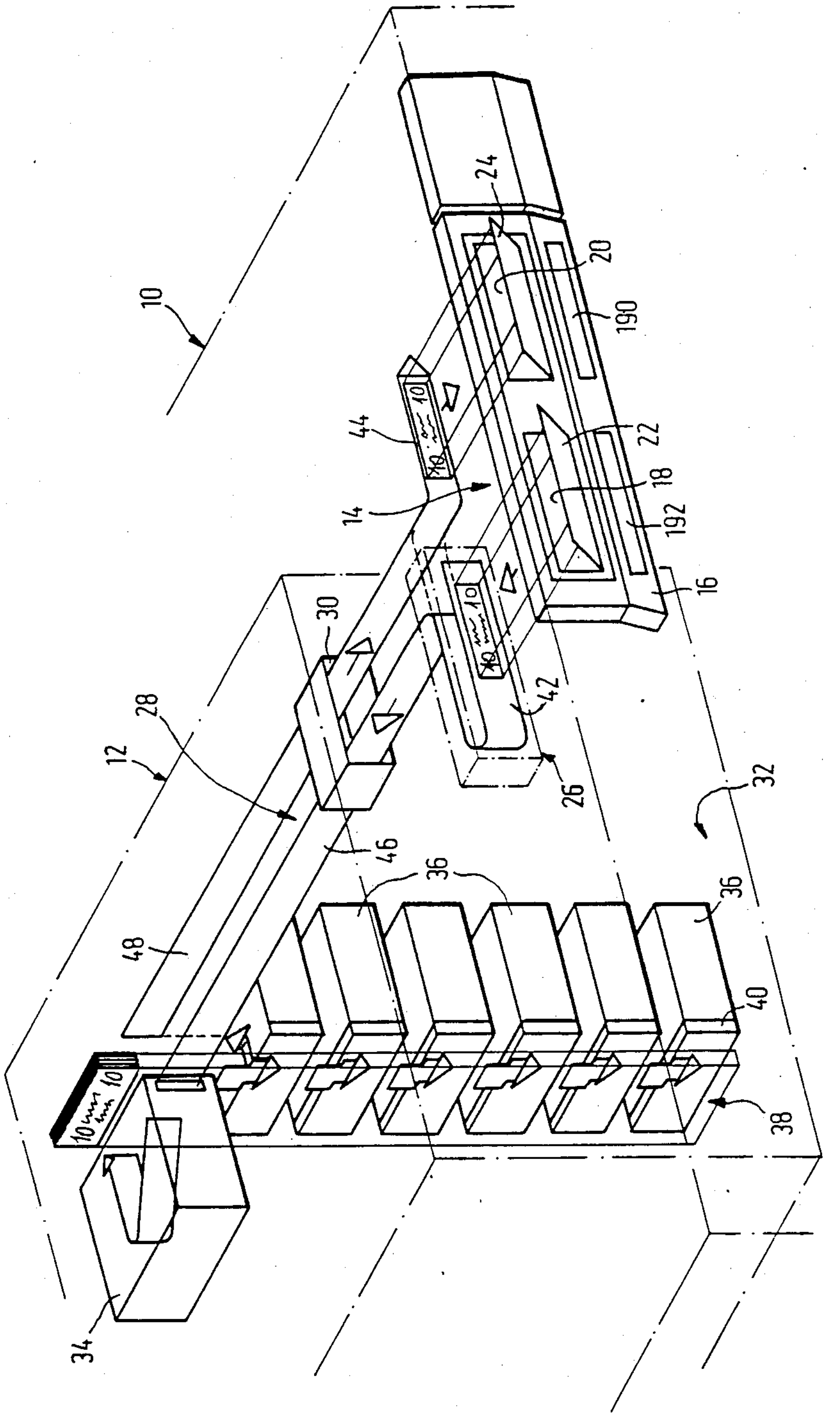
FIG. 1 is a schematic perspective view of the essential components of the device according to the invention.

In FIG. 1, dot-dash lines indicate a housing 10 in which a vault 12, likewise indicated by dot-dash lines, is arranged. Inside the housing 10, but outside the vault 12, there is a deposit/return unit designated generally by 14, having a deposit pocket 18 arranged in a wall 16 of the housing for deposit of bank notes or the like and a return pocket 20 to receive rejected bank notes, the two pockets 18 and 20 being each closable by a falp 22, 24. Immedaitely behind the deposit pocket 18 there is a unit 26, in block representation, to be further explained with reference to FIG. 2 and containing the bank note peeling and separating means, a pre-inspection unit and an aligning zone.

The deposit/return unit 14 communicates by way of a two-way conveyor 28 passing through an opening 30 in the wall 32 of the vault with an inspection unit 34 to verify the genuineness of and identify the bank notes deposited, which unit is arranged together with a plurality of instrument receptacles 36 inside the vault 12. The bank note inspection unit 34 communicates by way of a collection conveyor 38 with the several instrument receptacles 36. Each instrument receptacle 36 is furnished with a buffer 40 in which the bank notes to be handled can be held until the final instruction to place the bank notes in the receptacle 36 is received.

The device as so far described operates as follows.

At an operating station not shown, arranged at the device shown or at some other unit connected to the device shown by control lines, a customer must first identify himself and indicate the kind of bank note, the amount of the sum total, and the number of the account to which the amount deposited is to be credited. Then the customer places the bank notes to be paid in the form of a bundle in the deposit pocket 18 and closes the flap 22. The bank notes are now individually peeled off the bundle lengthwise and travel on a deposit track 42 through the pre-inspection unit and aligning zone. In the pre-inspection unit, the thickness is sensed to detect gross mechanical defects in the bank notes that might cause trouble in the sensitive bank note inspection unit 34. Examples of such defects are tape stuck on the bank notes, dog-eared corners, paper clips or the like. If such defects are detected, the bank notes are routed over a direct connection form the deposit track 42 to a return track 44 whence they are dropped in the return pocket 20. These bank notes rejected by the screening test, in other words, never arrive in the vault 12. If the defects in the bank notes are so serious that they will interfere with the function of the system even in the deposit/-return unit, the condition can be quickly remedied, since the housing 10 can be opened by a bank clerk with a key.

Bank notes that pass the screening test are supplied by way of the deposit track 46 of two-way conveyor 28 and the vault opening 30 to the inspection unit 34, where the bank notes are checked for genuineness and identified. If the bank notes are in order, they are passed on via the collection conveyor 38 to the holding buffer 40 of the appropriate receptacle 36. But if the inspection unit 34 detects any defects in the bank notes, the notes are immediately sent back out of the vault 12 through the opening 30 by way of the return track 48 of the two-way conveyor 28 and dropped in the return pocket 20. This process repeats itself until all bank notes in the bundle deposited have been inspected. Unless the customer for some reason interrupts the depositing operation, on completion of inspection the bank notes in the holding buffers 40 are dropped into the instrument receptacles 36. But if the customer does interrupt the depositing operation, the bank notes in the holding buffers 40 are sent back by way of the collection conveyor 38 to the return track 48 of the two-way conveyor 28 and thence conveyed to the discharge pocket 20.

In the device according to the invention, then, the instrument receptacles 36 and the bank note inspection unit 34 are effectively protected by the vault 12 from access by unauthorized persons. The vault 12 has only a small opening required for the two-way conveyor 28. The door of the vault, affording access to its interior, may be secured in conventional manner. The area in which malfunctions are primarily to be expected, namely the deposit and return unit and the pre-inspection unit, are arranged outside the vault, so that any malfunction that arises can be quickly corrected without need for access to the vault.

With reference to FIGS. 2 to 8, details of the conveyors of the deposit/return unit will now be explained.

Figure 3:
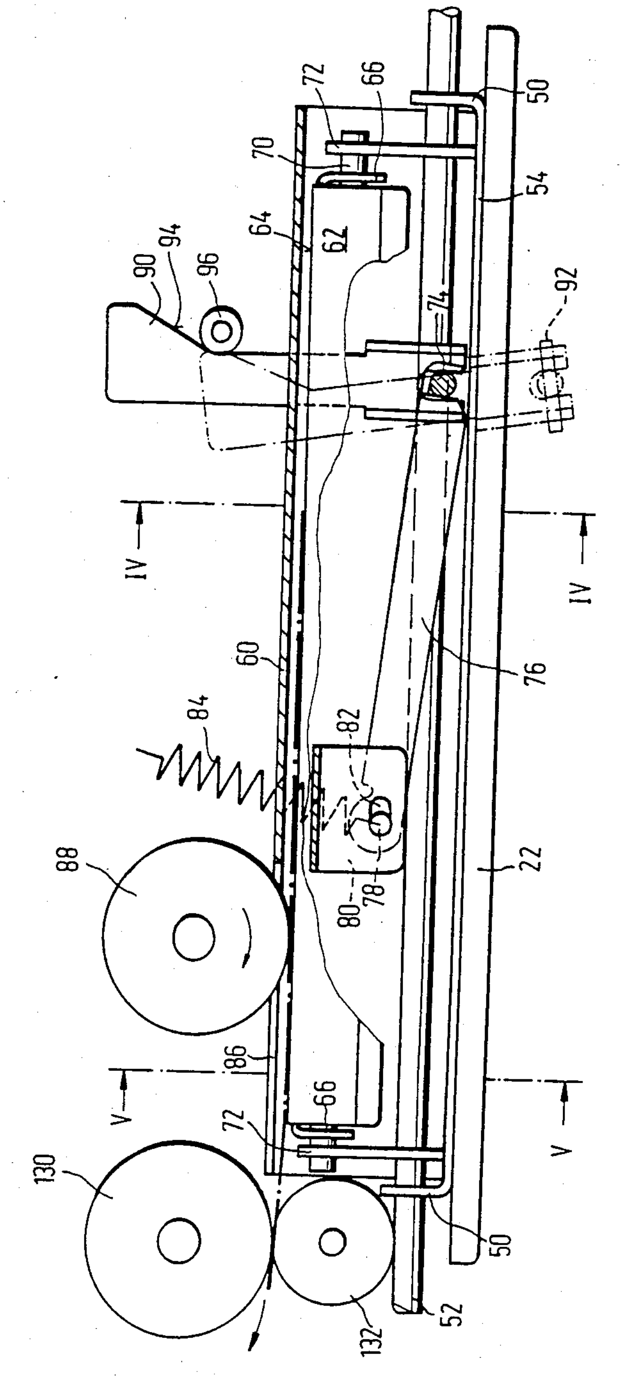
FIG. 3 is a schematic plan view, in partial section, of the deposit pocket in closed condition.
Figure 4:
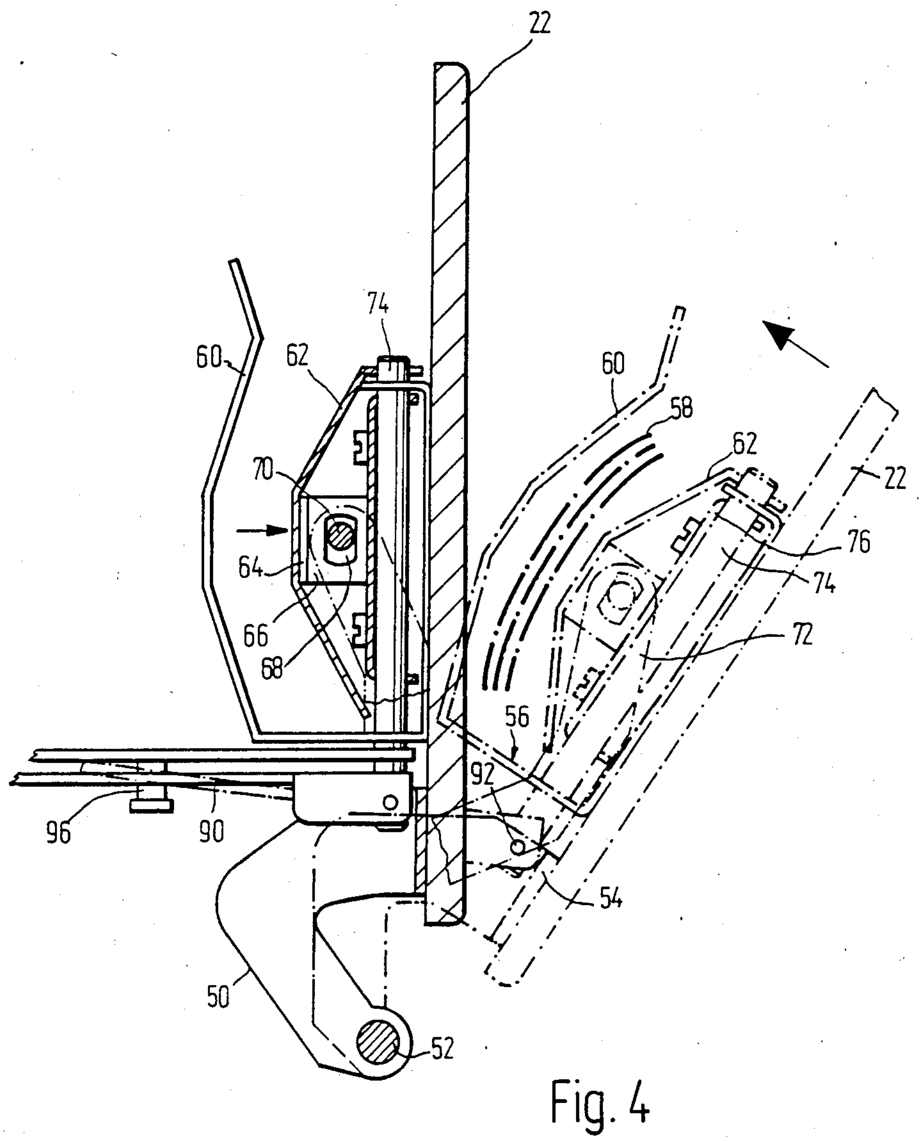
FIG. 4 is a section of the deposit pocket taken along the line IV—IV in FIG. 3.
Figure 5:
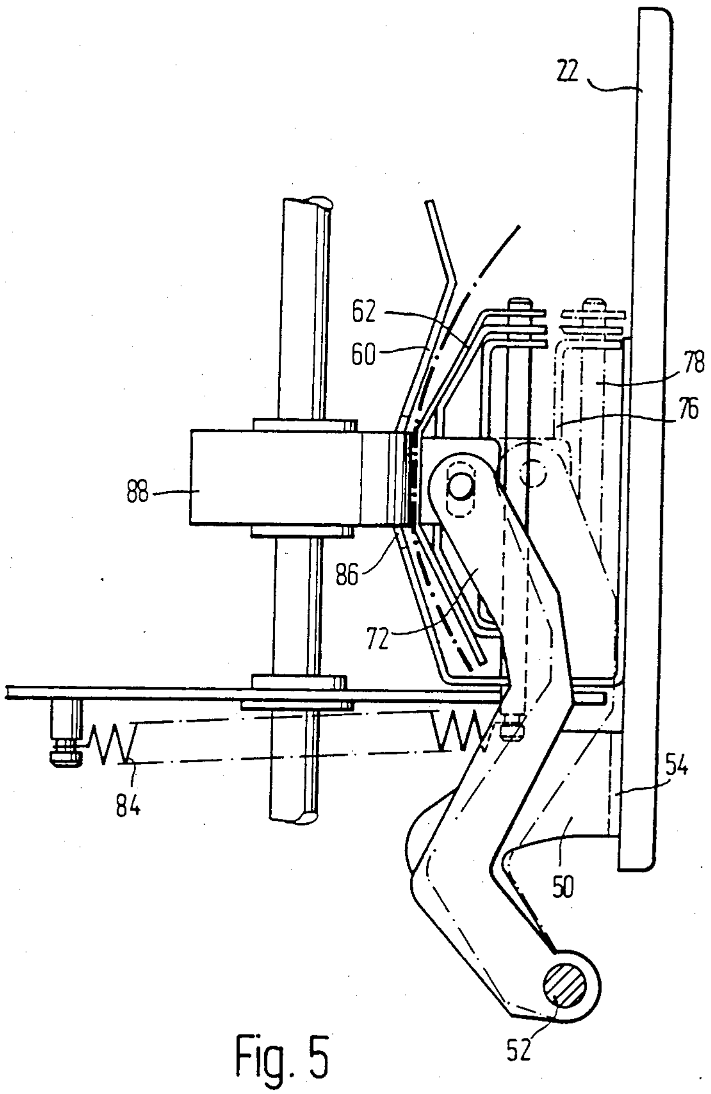
FIG. 5 is a section of the deposit pocket taken along the line V—V in FIG. 3.

The flap 22 of the deposit pocket 18 is hinged, as in FIGS. 3 to 5, on a flap shaft 52 fixed to the housing, by two levers 50. The levers 50 are integrally connected together by a beam 54 fixed to the inside of the flap 22. Likewise affixed to the inside of the flap 22 by one flange is a part 56 of more or less U-shaped cross section, forming a receiving trough for deposited bank notes 58. The flange of part 56 which is not affixed to the flap 22 serves as contact or support plate 60 for the bank notes 58. As may be seen especially in FIGS. 4 and 5, the support plate 60 is curved concave with respect to the receiving trough about an axis of curvature parallel to the flap shaft 52.

The bank notes 58 are pressed against the support plate 60 by a pressure plate 62. The pressure plate 62 is curved likewise, convex with respect to the receiving trough, about an axis of curvature parallel to the flap shaft 52, so that the bank notes 58 placed between the support plate 60 and the pressure plate 62 will be curved about their longitudinal axis. The purpose of this arrangement will be further explained below. The pressure plate 62 is fixed to a C-shaped stirrup 64 in each of whose flanges 66 there is an oblong hole 68 through which passes a shaft 70 parallel to the flap shaft 52. To the ends of the shaft 70, two levers 72 are articulated, the other ends of which are hinged to the flap shaft 52, so that the pressure plate 62 can swing together with the flap 22 or independently thereof about the same axis.

In the part 56 and the pressure plate 62, a shaft 74 is rotatably mounted parallel to the plane of the flap 22 and perpendicular to the flap shaft 52. The shaft 74 is rotationally fixed to a double latch or lever 76 whose other end is articulated by a shaft 78 parallel to shaft 74 and by a C-shaped stirrup 80 fixed to the pressure plate 62. The shaft 78 is guided in an oblong hole 82 in stirrup 80. The other end of shaft 78 is acted upon by a tension spring 84, urging the pressure plate 62 against the support plate 69. The guidance of the pressure plate 62 by the levers 72 and double latch 76 permits a wobble-free displacement of the pressure plate 62 parallel to itself. This is important in order to ensure a uniform contact pressure of the bank notes 58 against the support plate 60, since the bank note 58 directly in contact with support plate 60 at any time is to be peeled off by means of one or more rollers 88 entering through an opening 86 in the support plate 60 (FIG. 5). As may be seen in FIG. 5, the bank note 58 in question is pulled off in the direction parallel to the axis of curvature of the bank note. Owing to the curvature, the bank note is fairly stiff in the direction in which it is pulled off, so that in this condition the bank note may alternatively be pushed. This is important in the handling of bank notes, specifically since they have often been folded or rolled transverse to their lengthwise direction and hence have but little rigidity for transport in lengthwise direction.

When the deposit pocket is flapped open, the support plate 60 and pressure plate 62 move apart, to facilitate placement of a bundle of bank notes. In the embodiment described above, this is made possible by a cam slide 90, hinged to shaft 74 to swing about an axis perpendicular to the centerline of shaft 74, so that it is fixed in rotation with respect to the centerline of shaft 74 by the double latch 76. The slide 90 has an incline 94 guided on a stationary roller 96. When the flap 22 of the deposit pocket is swung out of the closed position into the open position, the slide 90 is swung out of the position indicated by solid lines in FIG. 3 into the position represented by dot-dash lines, about the centerline of shaft 74, the double latch 76 being sung into a position parallel to the plane of the flap. This brings the pressure plate 62 into its position close to the flap as shown in FIG. 4, so that the receiving trough of the deposit pocket is opened to its full width.

Figure 6:
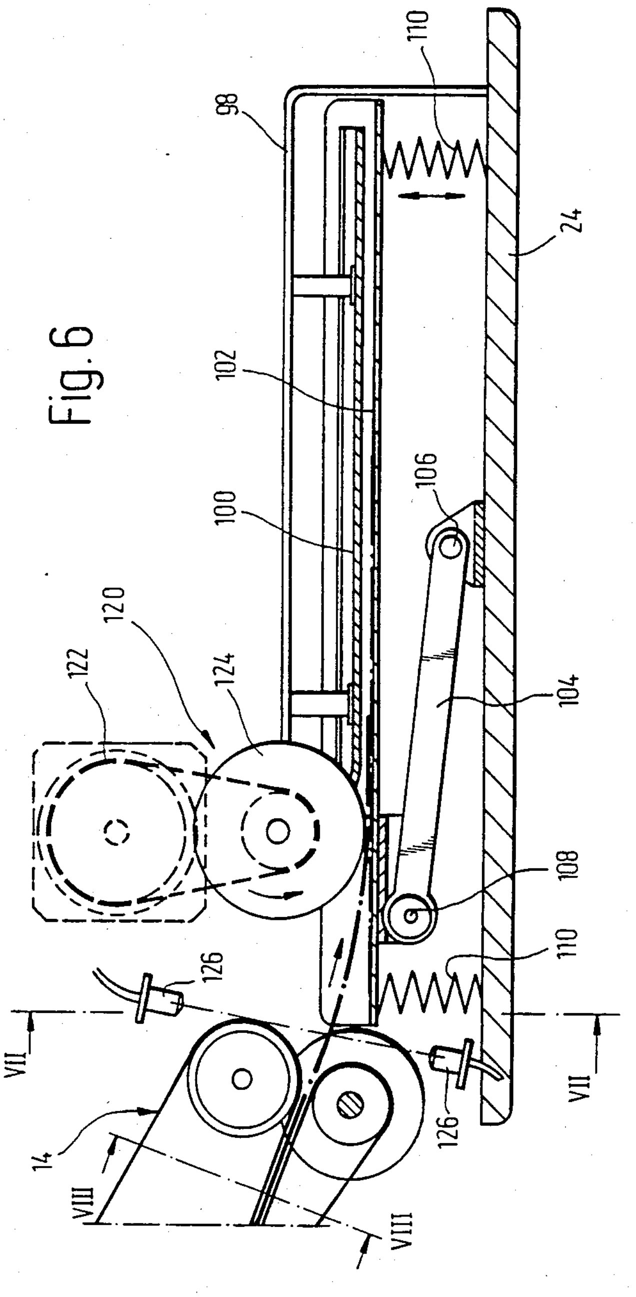
FIG. 6 is a schematic plan view, in partial section, of the return pocket.
Figure 7:
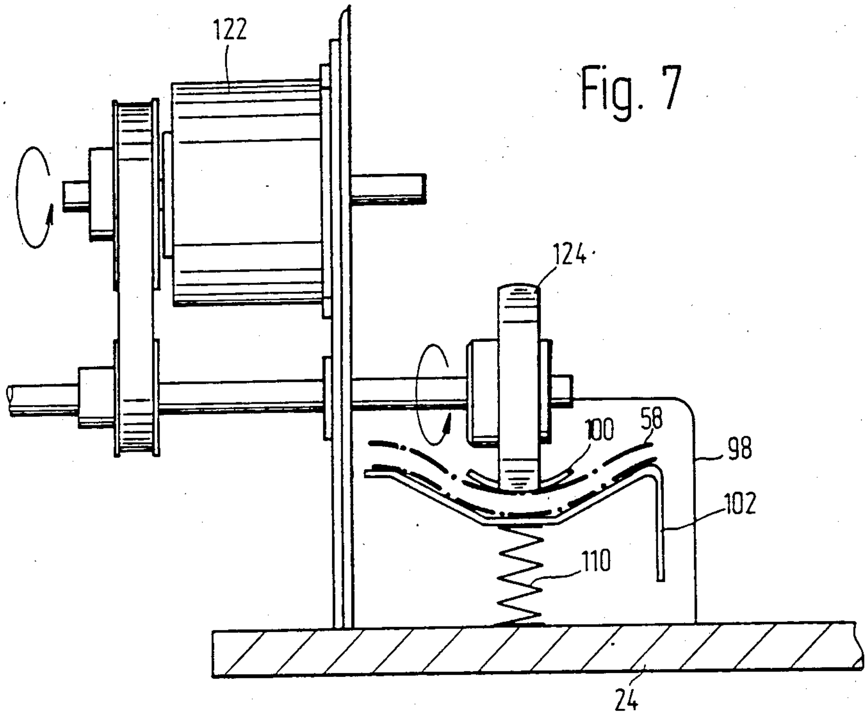
FIG. 7 is a section of the return pocket taken along the line VII—VII in FIG. 6.
Figure 8:
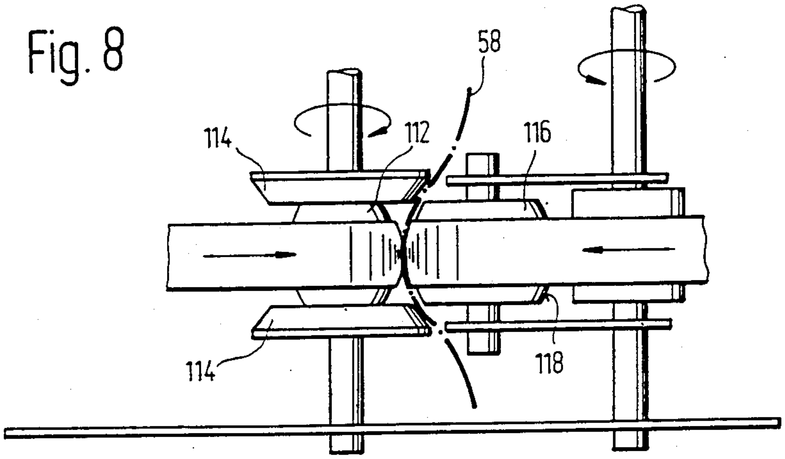
FIG. 8 is a section of the return pocket taken along line VIII—VIII in FIG. 6.

Referring now to FIGS. 6 and 7, the inside of the flap 24 of the return pocket 20, a support rail 100 directed parallel to the flap 24 is fixed by means of a stirrup 98, which rail is curved convex towards the flap 24 about an axis of curvature parallel to the flap shaft. The support rail 100 is associated with a contact pressure plate 102 articulated to the flap 24 by a double latch 104 with axes 106 and 108 perpendicular to the flap shaft and parallel to the plane of the flap. The pressure plate 102 is urged towards the support rail 100 by two compression coil springs 110 bearing on the inside of the flap 24. The pressure plate 102 is likewise curved the same way as the support rail 100, so that the bank notes 58 placed in the return pocket are likewise curved about an axis of curvature parallel to their lengthwise direction. This lends the bank note some stiffness in their lengthwise direction, so that they can be pushed into the return pocket. For this purpose, the bank notes are also ready-curved in the appropriate manner when they leave the return track 44 for the return pocket 20. At the delivery end of the return track 44, two cooperating feed rollers are arranged, of which one feed roller 112, as shown in FIG. 8, comprises two bevel disks 114 narrowing towards each other, lending the feed roller 112 a concave peripheral surface. This concave periphery of feed roller 112 is entered by the convex curved periphery 118 of the second feed roller 116 (FIG. 8). The bank notes 58 passing through are in this way arched about an axis of curvature parallel to their lengthwise direction, so that they may be freely pushed from the delivery end of the return track 114 towards the return pocket 20.

The complete insertion of the bank notes 58 in the return pocket 20 is accomplished with the aid of a positioning mechanism 120, as shown in FIG. 6. This comprises a step motor 122 and a friction wheel 124 driven by it, which engages the bank notes being advanced towards the return pocket at the entrance of the return pocket 20 and pushes them in. The arrangement is intended to be suitable for instruments of very different lengths. So it might happen that a comparatively short instrument would be pushed so far into the return pocket that the next following instrument would strike the posterior edge of the instrument or bundle already in the return pocket and be collapsed, thus blocking further insertion into the return pocket. This is prevented by the positioning mechanism 120. At the exit from the return track 44, a light barrier 126 is arranged, which starts the step motor, with some delay, upon passage of the anterior edge of a bank note, so that the entering bank note will be picked up by the friction wheel 124 and pushed into the return pocket 20. Upon passage of the posterior edge of the bank note, the light barrier 126 instantly switches off the step motor 122, so that the entering bank note is not pushed all the way into the return pocket, but, as shown in FIG. 6, rests against the pressure plate 102 with a posterior portion still outside the return pocket. The curvature of the bank note 58 ensures that it will make smooth contact with the pressure plate 102.

A following bank note, owing to the orientation of the return track 44 relative to the pressure plate 102, is now guided towards a point of impact located between the posterior end of the preceding bank note and the friction wheel 124. Hence, when the friction wheel 124 starts, the bank note now entering can slip into the return pocket over the preceding bank note. This ensures that the following bank note will not get caught on the preceding bank note and be collapsed. The preceding bank note is carried along by the friction between the two notes and pushed all the way into the return pocket 20. The bank notes are positioned independently of their particular length, with their posterior edge always in a preassigned location.

The construction of the deposit and return pockets with curved support and pressure surfaces and the positioning mechanism described above may be employed quite in general, independently of the application here described, wherever sheets of paper or the like are to be pushed over a given distance and/or pushed into a pocket.

Figure 2:
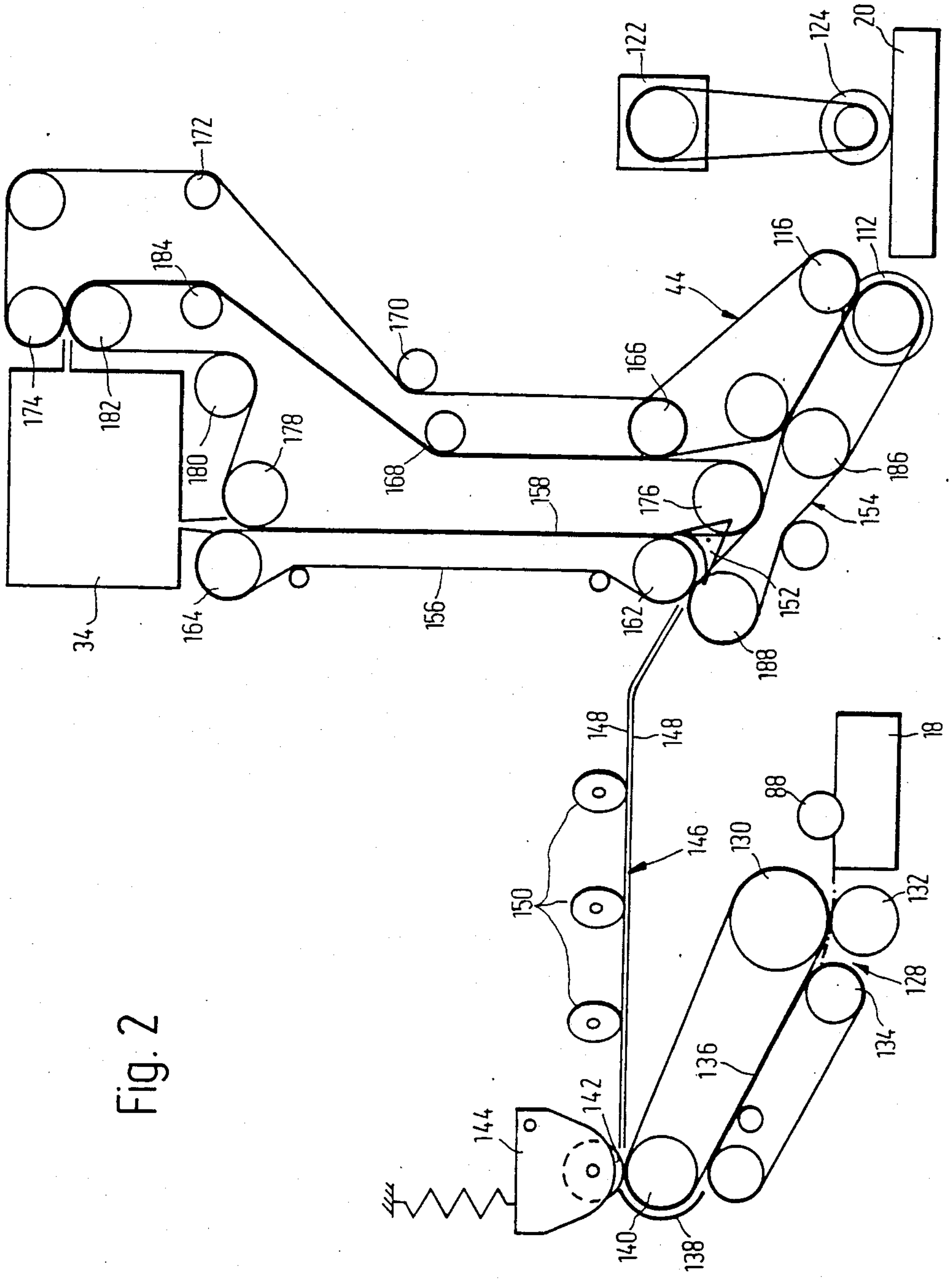
FIG. 2 is a schematic plan view of the conveyor tracks between deposit pocket, return pocket and bank note inspection unit.

Referring now to FIGS. 1 and 2, the conveyors will now be described in detail. At one of the lengthwise ends of the deposit pocket 20, a peeling and separating means designated generally by 128 is arranged. It comprises the peeling roller 88 entering through the support plate 60 and advancing one bank note at a time towards two feed cylinders 130 and 132, associated with a counter-rotating roller 134 to detach a second bank note that may be carried along. From the feed rollers 130, 132, the bank note is passed by a belt drive 136 and a guide plate 138 between two sensor cylinders 140 and 142, of which the latter is arranged on a rocker 144 so that it is movable relative to the sensor cylinder 140 by way of a change in the distance between their centerlines.

The sensor cylinders 140 and 142 are followed by an aligning zone 146 in which the bank note, standing directly between two guide plates 148, is pushed against a contact edge by means of aligning rollers 150 directed oblique to the direction of advance. At the end of the guide plates 148, the bank note is routed by a switch 152 either to the deposit track 46 of the two-way conveyor 28 or to a conveyor 154 placing the end of the deposit track 46 of the two-way convertor 28 or to a conveyor 154 placing the end of the deposit track 42 directly in communication with the return track 44. The switch 152 is set by the sensor cylinders 140 and 152 is such manner that when a preassigned distance between centerlines of the sensor cylinders 140 and 142 is exceeded, the switch 152 sends the bank note then passing through directly to the return track 44.

The two-way conveyor 28 consists of three adjacent belt drives 156, 158 and 160, the feed rollers 162 and 164 of the first belt drive 156 and the feed rollers 166, 168, 170, 172 and 174 of the third belt drive 160 rotating the same direction, while the feed rollers 176, 178, 180, 182 and 184 of the middle belt drive 158 rotate in the opposed direction. Thus, one span of the middle belt drive 158 cooperates with the belt drive 156 on the left in FIG. 2 to form the deposit track 46, while the other span cooperates with the belt drive 160 on the right in FIG. 2 to form the return track 48. Through this construction of the two-way conveyor 28, it is possible to keep the cross section of the opening 30 in the wall 32 of the vault very small.

The return track comprises a drive belt passing over the rollers 166 and 116 and a drive belt passing over a roller 86 and the roller 112 to cooperate therewith. The roller 186 at the same time belongs to the connecting track, comprising a belt drive passing over the roller 186 and a roller 188.

It remains to add that in the housing wall 16 below the return pocket 20 and the deposit pocket 18, a pocket for envelopes and a slot are provided. The customer can take an envelope from the pocket 190, insert a communication intended for the bank, and drop the envelope in the slot 192.

Figure 9:
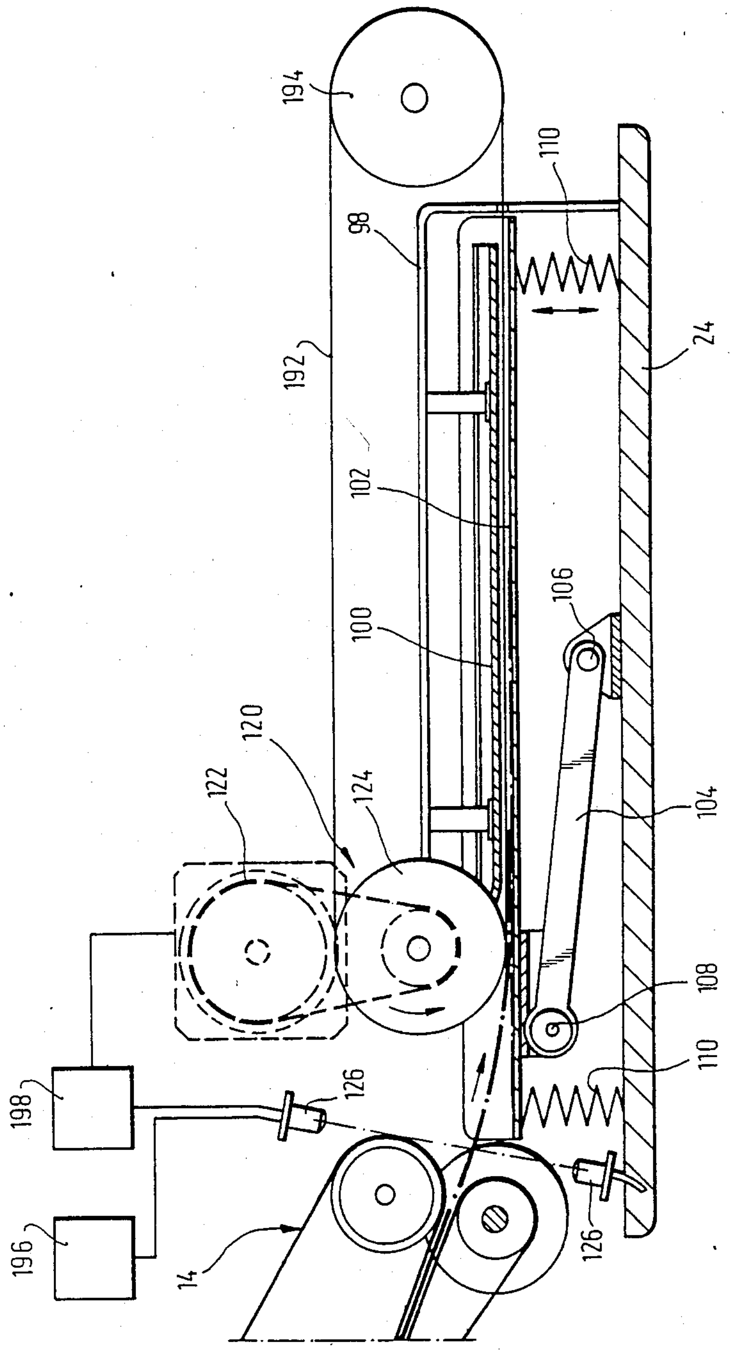
FIG. 9 is a view, similar to FIG. 6, of a modified embodiment of the invention.

The embodiment of the return system as represented in FIG. 9 differs in the first place in that the instruments are pushed into the return pocket no only by the friction wheel 124 alone, but also by an endless conveyor belt 192 encircling firstly the friction wheel 124 and secondly a roller 194, and having one span parallel to the direction of insertion between the support rail 100 and the pressure plate 102. By means of this conveyor belt 192, it is ensured that even well-worn and floppy instruments will be pushed completely into the return pocket without buckling.

With the return system described earlier with reference to FIG. 6, it is not in general possible to stack instruments of different lengths so that their anterior edges are all flush. To achieve this, a measuring system designated generally by 196 in FIG. 9 is provided, which is intended to obtain and store a reading corresponding to the length of the instruments passing through. It comprises a pulse transmitter coupled to the main drive, not shown, of the conveyor, whose pulses are counted by the light barrier 126 during passage of an instrument and then stored. In a control unit 198, the delay after which the drive motor 122 is started on the next instrument is varied as a function of the length of the preceding instrument.

In the system of FIG. 6, the drive element 124 must be driven by motor 122 having as short as possible full-speed phase so that the drive element 124 will have reached its rated speed, or at least 80 percent thereof, upon entry of the instrument into the gap between the drive element 124 and pressure plate 102. Since the drive element 124 in the embodiment of FIG. 9 is controlled based upon the length of the instrument, it is only necessary that the drive element 124 has reached at least 80 percent of its rated speed when the longest instruments accommodated by the device are handled. In the next full-speed phase of the drive element 124, the anterior edge of that instrument will just reach the boundary of the return pocket in the direction of transport. For a shorter instrument, on the other hand, the drive element 124, or 192, will have been started correspondingly earlier, so that the anterior edge of the shorter instrument already in the return pocket will reach the same end position. Here again, as in the embodiment previously described, the condition is that the instrument put in is not to be transported further until the anterior edge of the following instrument is sure to have overtaken the posterior edge of the instrument being handled. Instead of the former preassigned constant delay between passage of the anterior edge through the light barrier 126 and the starting of the drive element 124, the staring of the drive element 124 is now dependent on the length of the instrument previously placed in the return pocket. The maximum length differeneces that can be handled are given by the distance from light barrier 126 to drive element 124 less the full-speed and stopping distance of the drive element 124.

Figure 10:
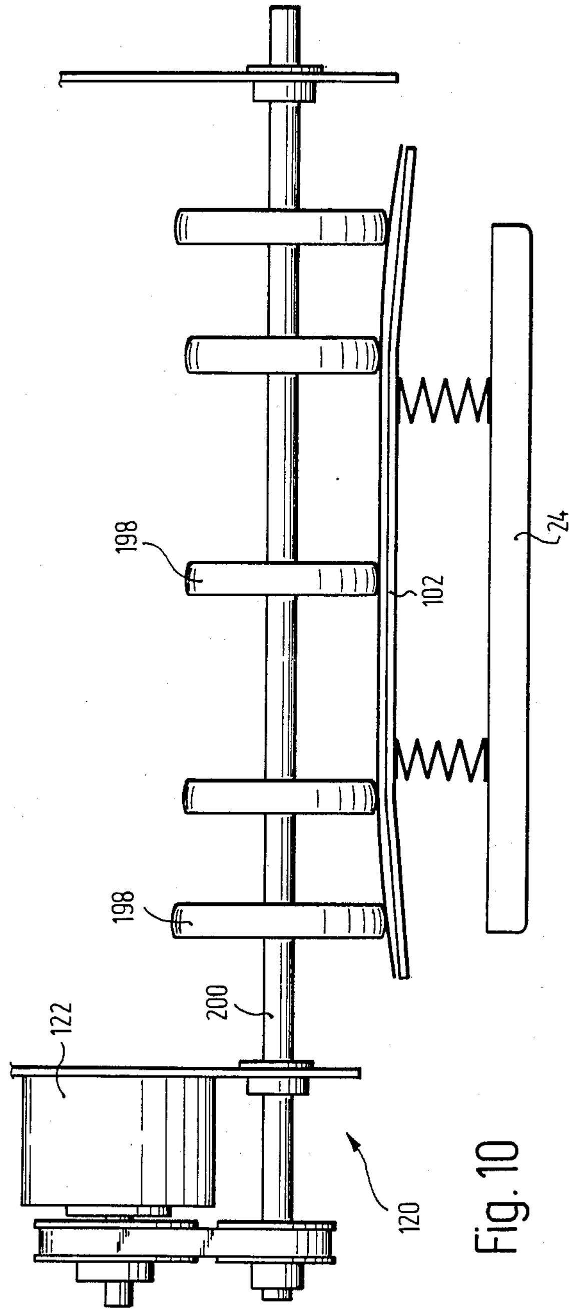
FIG. 10 is a view, similar to FIG. 7, of a modified embodiment of the handling mechanism.

FIG. 10 shows a positioning mechanism especially suitable for handling instruments being transported in crosswise direction. Instead of a single drive roller 124, several rollers 198 are provided, arranged coaxially and at an axial distance from each other on a drive shaft 200, their diameters being adapted to the curvature of the pressure plate 102 so that the instruments are arched about an axis parallel to the direction of transport and thus acquire the necessary stiffness for being pushed.

Figure 11:
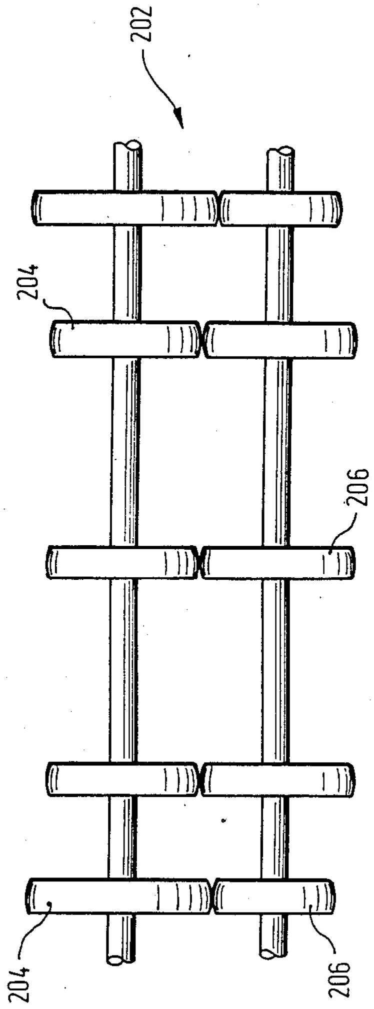
FIG. 11 is a schematic view of the transfer rollers at the end of the return track towards the return pocket.

In like manner, instead of the embodiment in FIG. 8, at the end of the return track 44 a pair of transfer rollers 202 may be provided, as shown in FIG. 11, having a plurality of first feed rollers 204 and second feed rollers 206 whose diameters again are matched so that the gap formed between them is curved about an axis parallel to the direction of feed. Then, as before, a curvature may be imparted to a note passing through, enhancing its stiffness for pushing. It will be understood that conveyor belts, not shown, may be passed over the feed rollers 204 and 206.

What is claimed is:

1. A device for receiving, inspecting and storing instruments of value such as bank notes, comprising:

a lockable housing enclosing at least one instrument receptacle, inspection means for inspecting and identifying the instruments, a deposit unit having a deposit pocket and a return pocket arranged on a wall of the housing, and conveyor means for conveying instruments between said deposit unit and the inspection means and for conveying instruments between the inspection means and the instrument receptacle;

a locked vault enclosing said instrument receptacle and a first part of said inspection means, said locked vault having an opening formed in a wall, said conveyor means having a two-way conveyor passing through said opening for transferring said instruments of value between the deposit unit and the inspection means and between the receptacle and the deposit unit.

2. A device as recited in claim 1, wherein the deposit unit has a deposit track leading from a peeling and separating means at the deposit pocket to the two-way conveyor and a return track leading from the two-way convey to the return pocket, said deposit unit further including a pre-inspection unit arranged in the path of the deposit track for screening the instruments and a switch means controlled by the pre-inspection unit for placing the deposit track and the return track in direct communication with each other.

3. A device as recited in claim 1, wherein the two-way conveyor comprises three adjacently arranged rows of feed rollers, the feed rollers of any two rows of rollers immediately adjacent to each other being driven in opposed directions of rotation.

4. A device as recited in claim 3, wherein said two-way conveyor further comprises endless belts which are passed over the feed rollers of each row.

5. A device as recited in claim 1, wherein an instrument holding buffer adapted to be placed in communication with the two-way conveyor is arranged between the output of the first part of the inspection means and the instrument receptacle.

6. A device as recited in claim 2, wherein the pre-inspection unit has two sensor cylinders located adjacent each other and forming a slit therebetween which scan the thickness of instruments passing through the slit, said two sensor cylinders being relatively moveable to each other in response to the thickness of said instruments.

7. A device as recited in claim 2, wherein an aligning zone is arranged between the pre-inspection unit and the two-way conveyor.

8. A device as recited in claim 1, wherein a peeling and separating means is arranged at one lengthwise end of the deposit pocket and the instruments are peeled and introduced into the conveyors lengthwise.

9. A device, as recited in claim 1, wherein the deposit pocket and the return pocket are each bounded by a support plate and a contact pressure plate disposed substantially perpendicular to the support plate, said pressure plate being urged towards the support plate, and said support plate and said pressure plate being curved about an axis of curvature parallel to the direction in which the instruments are introduced into the conveyors.

10. A device as recited in claim 9, further comprising a first feed roller having a concave periphery and a second feed roller having a convex periphery, said second feed roller being adapted to cooperate with the first feed roller, said first and second feed rollers being arranged at the end of the return track near the return pocket.

11. A device as recited in claim 9, further comprising a plurality of first feed rollers being coaxially arranged and axially spaced from each other at the end of the return track proximate the return pocket, each of said first feed rollers cooperating with associated second feed rollers being coaxially arranged and axially spaced from each other and corresponding to the location of the first feed rollers, said first and second feed rollers forming a gap between corresponding first and second feed rollers, said gap being curved about an axis parallel to the direction of feed.

12. A device as recited in claim 9, wherein the support plate and the pressure plate are arranged on a flap hinged to the wall of the housing, said flap being pivotable about an axis aligned parallel to said wall between a closed position and an open position.

13. A device as recited in claim 12, wherein the support plate of the deposit pocket has an opening formed through the support plate, closed position of the flap, and further comprises a peeling roller of the peeling and separating means which extends through the opening in the support plate when said flap is in the closed position.

14. A device as recited in claim 12, wherein said pressure plate is guided in its movement on the flap of the deposit pocket by two levers, mounted at an axial distance from each other on the flap shaft at one end and another end of the pressure plate being guided in its movement by a pin-and-slot link having a pivot axis parallel to the flap shaft, said pressure plate being connected to the flap by a double latch having axes parallel to the plane of the flap and perpendicular to the axis of the flap shaft.

15. A device as recited in claim 14, wherein the double latch is connected in fixed manner with respect to rotation about the latch axis to a slide, said slide being adapted to follow a cam track formed upon one side of the side to pivot in the direction of the approach of the double latch to the flap when the flap passes into its open position.

16. A device as recited in claim 9, wherein the pressure plate of the return pocket is articulated to the flap by a double latch having axes parallel to the plane of the flap and perpendicular to the axis of the flap, and said pressure plate is urged towards the support plate by springs.

17. A device as recited in claim 1, wherein a positioning means is provided in the return pocket for positioning an instrument with is posterior edge at a preassigned location in the return pocket, wherein the direction of feed at the end of the return track near the return pocket is oriented at an obtuse angle relative to the direction of advance inside the return pocket, and the point of impact of an arriving instrument from the direction of feed is located behind the preassigned location for the position of the posterior edge of the preceding instrument in each instance.

18. A device as recited in claim 17, wherein the positioning mechanism has a drive motor and at least one drive member driven thereby and adapted to rest against an instrument and a sensor means being arranged in the path of the arriving instrument spaced from the drive member for detecting the presence of an instrument in the path of the arriving instrument, said sensor means being electrically connected to means for delaying a signal and means for energizing said drive motor after passage of the anterior edge of an instrument and for deenergizing said drive motor upon passage of the posterior edge.

19. A device as recited in claim 9, wherein the positioning mechanism comprises a plurality of drive rollers coaxially arranged axially spaced from each other, said drive rollers having different diameters corresponding to the curvature of the contact pressure plate.

20. A device as recited in claim 9, wherein the drive member comprises an endless drive belt, one span of which circulates between pressure plate and support plate parallel to the direction of stacking of the instruments.

21. A device as recited in claim 18, further comprising measuring means for measuring and storing a reading corresponding to the length of the instruments sent to the return pocket, and wherein the delay with which the drive motor of the positioning mechanism can be switched on to stack an instrument is variable as a function of the reading corresponding to the length of the instruments stored for the immediately preceding instrument.

22. A device as recited in claim 21, wherein the measuring means comprises a pulse transmitter coupled to the drive motor of the return track, and a pulse counter controlled by the sensor means.

* * * * *